United States Patent
Leddy, III

(10) Patent No.: US 11,290,452 B2
(45) Date of Patent: Mar. 29, 2022

(54) SYSTEMS, METHODS, AND COMPUTER PROGRAM PRODUCTS FOR AUTHENTICATING DEVICES

(71) Applicant: Visa International Service Association, San Francisco, CA (US)

(72) Inventor: William Joseph Leddy, III, Lakeway, TX (US)

(73) Assignee: Visa International Service Association, San Francisco, CA (US)

( * ) Notice: Subject to any disclaimer, the term of this patent is extended or adjusted under 35 U.S.C. 154(b) by 306 days.

(21) Appl. No.: 16/548,944

(22) Filed: Aug. 23, 2019

(65) Prior Publication Data

US 2021/0058392 A1    Feb. 25, 2021

(51) Int. Cl.
| | |
|---|---|
| H04L 29/12 | (2006.01) |
| G06Q 20/40 | (2012.01) |
| H04L 29/06 | (2006.01) |
| G06F 21/44 | (2013.01) |
| G06Q 20/12 | (2012.01) |

(52) U.S. Cl.
CPC .......... *H04L 63/0876* (2013.01); *G06F 21/44* (2013.01); *G06Q 20/401* (2013.01); *G06F 2221/2103* (2013.01)

(58) Field of Classification Search
None
See application file for complete search history.

(56) References Cited

U.S. PATENT DOCUMENTS

| | | | |
|---|---|---|---|
| 9,589,399 B2 | 3/2017 | Taveau et al. | |
| 9,954,881 B1* | 4/2018 | Lin | H04L 63/0236 |
| 11,095,643 B2* | 8/2021 | Huffman | H04L 63/0884 |
| 2006/0080464 A1* | 4/2006 | Kozuki | H04L 63/06 |
| | | | 709/245 |

(Continued)

OTHER PUBLICATIONS

Security Modeling of Mobile Payment System Architecture. Olanrewaju (Year: 2013).*

(Continued)

*Primary Examiner* — Venkat Perungavoor
(74) *Attorney, Agent, or Firm* — The Webb Law Firm

(57) ABSTRACT

Disclosed are non-limiting methods for authenticating devices, comprising receiving a request for a device authentication identifier, transmitting a device authentication request message via a frame embedded in a webpage of a merchant website, the device authentication request message comprising challenge data associated with a challenge, receiving a device authentication response message via the frame embedded in the webpage of the merchant website based on the device authentication request message, the device authentication response message comprising challenge response data associated with a challenge response, transmitting the device authentication identifier message based on the device authentication response message, receiving a transaction request message for a transaction, comprising the device authentication identifier and transaction data associated with the transaction, determining the device score based on the device authentication identifier, and generating, an authorization request message based on the transaction data and the device score. Systems and computer program products are also disclosed.

15 Claims, 5 Drawing Sheets

(56) References Cited

U.S. PATENT DOCUMENTS

| | | | |
|---|---|---|---|
| 2007/0291996 | A1 | 12/2007 | Hoffman et al. |
| 2008/0040261 | A1* | 2/2008 | Nix ........................ G06Q 20/06 705/39 |
| 2008/0249938 | A1 | 10/2008 | Drake-Stoker |
| 2008/0313064 | A1 | 12/2008 | Nelson |
| 2010/0318460 | A1 | 12/2010 | Stewart et al. |
| 2011/0179477 | A1* | 7/2011 | Starnes ................... H04L 63/12 726/9 |
| 2013/0308778 | A1* | 11/2013 | Fosmark ............. H04L 63/0823 380/270 |
| 2014/0114857 | A1 | 4/2014 | Griggs et al. |
| 2015/0215312 | A1* | 7/2015 | Cesnik ............... H04L 63/0853 726/9 |
| 2017/0303111 | A1* | 10/2017 | Kohli ...................... G06F 21/44 |
| 2018/0007052 | A1* | 1/2018 | Quentin .................. H04L 63/10 |
| 2018/0054312 | A1 | 2/2018 | Kamal |
| 2018/0239890 | A1* | 8/2018 | Hefetz .................... G06F 21/73 |
| 2018/0268436 | A1* | 9/2018 | Sprague ............. G06Q 30/0248 |
| 2020/0065814 | A1* | 2/2020 | Fang .................. G06Q 20/4014 |
| 2020/0403992 | A1* | 12/2020 | Huffman ............... H04W 12/06 |

OTHER PUBLICATIONS

CN105516396. Liu. English Translation. (Year: 2016).*
Fraud Detection in E-Commerce Using Machine Learning. Saeed. IJATCSE. (Year: 2021).*
Contemplation of Effective Security Measures in Access Management from Adoptability Perspective. Mehraj. IJACSA. (Year: 2015).*
Attacks on Bluetooth Security Architecture and Its Countermeasures. Iqbal. Springer-Verlag. (Year: 2010).*
Online Credit Card Fraud: An Emerging Crime in the Information Technology. Carolina. (Year: 2012).*
Detecting Online Game Chargeback Fraud Based on Transaction Sequence Modeling Using Recurrent Neural Network. Lee. Springer. (Year: 2018).*
Predictive Modeling with Delayed Information: a Case Study in E-commerce Transaction Fraud Control. Li. (Year: 2018).*
Card-Not-Present Fraud—Challenges and Counteractions. Parusheva. (Year: 2015).*
Study and Implementation of Multi-Criterion Authentication Approach To Secure Mobile Payment System. Parte. IJESAT. (Year: 2014).*
Authenticated Key Agreement Based on NFC for Mobile Payment. Seo. IJCCE. (Year: 2016).*
E-Commerce Payment Authentication System With Sim Card. Tanaya. (Year: 2017).*

* cited by examiner

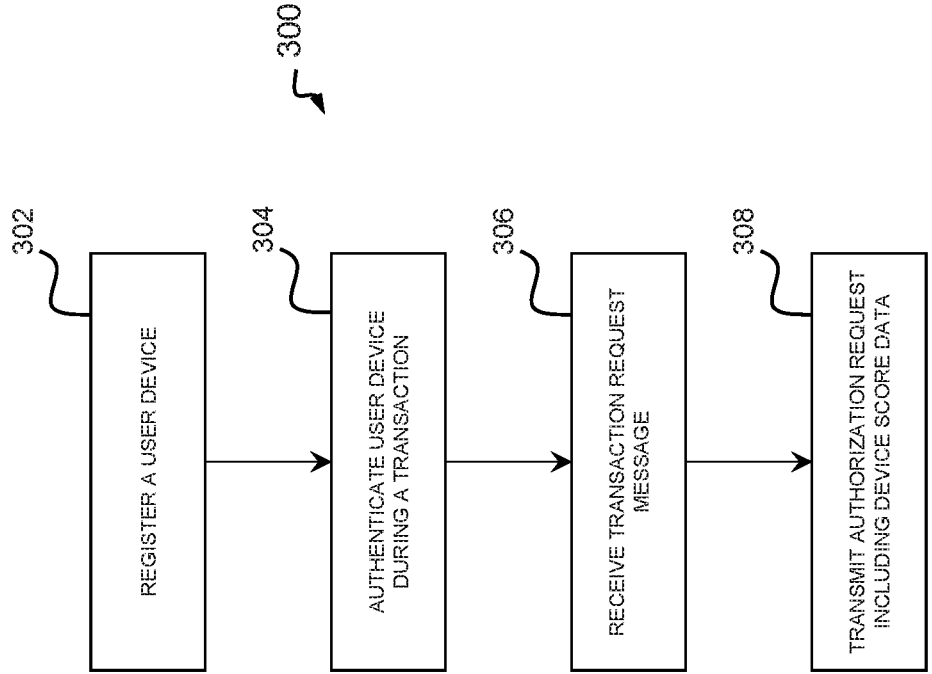

SYSTEMS, METHODS, AND COMPUTER PROGRAM PRODUCTS FOR AUTHENTICATING DEVICES

BACKGROUND

1. Technical Field

The present disclosure relates generally to authenticating devices and, in some non-limiting aspects or embodiments, to systems, methods, and computer program products for determining device scores based on authentication of the device across one or more transactions.

2. Technical Considerations

Electronic devices may be used (e.g., smartphones, laptop computers, desktop computers, and/or the like) to conduct an electronic payment transaction. For example, an online purchase may include communication between multiple computing devices, such as a device operated by an individual, a device operated by or on behalf of a merchant, and a device operated by or on behalf of a transaction service provider. These devices may communicate information such as the identity of an individual purchasing goods and/or services, a quantity and price of the goods and/or services purchased, account information for use in settling the transaction, and/or the like.

However, fraudulent purchases may be made on behalf of the individual by initiating communication between a non-approved individual (e.g., an individual not approved to make purchases on behalf of the individual), the merchant, and/or the transaction service provider. For example, a non-approved individual may intercept information communicated between the device operated by the individual and the devices operated by the merchant and/or the transaction service provider. In such an example, the non-approved individual may then initiate a transaction based on the intercepted information.

SUMMARY

Accordingly, systems, devices, products, apparatus, and/or methods for authenticating devices are disclosed that overcome some or all of the deficiencies of the prior art.

According to some non-limiting aspects or embodiments, provided is a computer-implemented method for authenticating devices, the computer-implemented method comprising: receiving, with at least one processor, a request for a device authentication identifier of an account of a user; transmitting, with at least one processor, a device authentication request message via a frame embedded in a webpage of a merchant website, the device authentication request message comprising challenge data associated with a challenge; receiving, with at least one processor, a device authentication response message via the frame embedded in the webpage of the merchant website based on the device authentication request message, the device authentication response message comprising challenge response data associated with a challenge response; transmitting, with at least one processor, a device authentication identifier message comprising the device authentication identifier associated with the account of the user based on the device authentication response message; receiving, with at least one processor, a transaction request message associated with a transaction, comprising: the device authentication identifier, and transaction data associated with the transaction, determining a device score associated with the account of the user based on the device authentication identifier; and generating, with at least one processor, an authorization request message based on the transaction data and the device score.

In some non-limiting aspects or embodiments, the computer-implemented method may comprise transmitting, with at least one processor, the authorization request message to an issuer system; receiving, with at least one processor, an authorization response message from the issuer system, the authorization response message generated in response to receiving the authorization request message; and updating, with at least one processor, the device score based on disposition of the transaction.

According to some non-limiting aspects or embodiments, the computer-implemented method may comprise: receiving, with at least one processor, a public key from a computing device associated with a user to register the computing device with the account associated with the user, the account further associated with the device score; wherein, when registering the computing device with an account associated with the user, the device score is set to a default value associated with a default score.

In some non-limiting aspects or embodiments, the computer-implemented method may comprise: determining, with at least one processor, that a second computing device was previously registered with the account associated with the user, wherein, when registering the computing device with the account associated with the user, the device score is set to a value of an existing device score of the second computing device.

According to some non-limiting aspects or embodiments, the computer-implemented method may comprise: in response to updating the device score, transmitting, with at least one processor, the device score and a transaction response message to a computing device associated with a merchant, wherein updating the device score based on the disposition of the transaction further comprises: determining whether a chargeback occurred or did not occur within a period of time after the transaction was settled; and updating the device score based on determining whether the chargeback occurred or there was no chargeback within the period of time.

In some non-limiting aspects or embodiments, the computer-implemented method may include: receiving, with at least one processor, an authorization response message; determining, with at least one processor, that the transaction is declined based on the authorization response message; and updating, with at least one processor, the device score based on determining that the transaction is declined based on the authorization response message.

According to some non-limiting aspects or embodiments, the computer-implemented method may include: determining, with at least one processor, that a fraudulent transaction is associated with an account associated with the user; and updating, with at least one processor, the device score based on determining the fraudulent transaction is associated with the account associated with the user.

In some non-limiting aspects or embodiments, the computing device associated with the user may be configured to: display, on a display of the computing device associated with the user, a local authentication request in response to receiving the device authentication request message; receive a local authentication response as input at the computing device associated with the user; and transmit a device authentication response based on receiving the local authentication response.

According to some non-limiting aspects or embodiments, a system for authenticating devices may include: at least one processor programmed or configured to: receive a request for a device authentication identifier of an account of a user; transmit a device authentication request message via a frame embedded in a webpage of a merchant website, the device authentication request message comprising challenge data associated with a challenge; receive a device authentication response message via the frame embedded in the webpage of the merchant website based on the device authentication request message, the device authentication response message comprising challenge response data associated with a challenge response; transmit a device authentication identifier message comprising the device authentication identifier associated with the account of the user based on the device authentication response message; receive a transaction request message associated with a transaction, comprising: the device authentication identifier, and transaction data associated with the transaction, determine a device score associated with the account of the user based on the device authentication identifier; and generate an authorization request message including the transaction data and the device score.

In some non-limiting aspects or embodiments the at least one processor of the system may be programmed or configured to: transmit the authorization request message to an issuer system; receive an authorization response message from the issuer system, the authorization response message generated in response to receiving the authorization request message; and update the device score based on disposition of the transaction.

According to some non-limiting aspects or embodiments, the at least one processor of the system may be programmed or configured to: receive a public key from a computing device associated with a user to register the computing device with the account associated with the user, the account further associated with the device score; wherein, when registering the computing device with an account associated the user, the at least one processor is programmed or configured to set the device score to a default value associated with a default score.

In some non-limiting aspects or embodiments, the at least one processor of the system may be programmed or configured to: determine that a second computing device was previously registered with the account associated with the user, wherein, when registering the computing device with the account associated with the user, the at least one processor is programmed or configured to set the device score to a value of an existing device score of the second computing device.

According to some non-limiting aspects or embodiments, the at least one processor of the system may be programmed or configured to: in response to updating the device score, transmit the device score and a transaction response message to a computing device associated with a merchant, wherein when updating the device score based on the disposition of the transaction, the at least one processor is programmed or configured to: determine whether a chargeback occurred or did not occur within a period of time after the transaction was settled; and update the device score based on determining whether the chargeback occurred or there was no chargeback within the period of time.

In some non-limiting aspects or embodiments, the at least one processor of the system may be programmed or configured to: receive an authorization response message; determine that the transaction is declined based on the authorization response message; and update the device score based on determining that the transaction is declined based on the authorization response message.

According to some non-limiting aspects or embodiments, the at least one processor of the system may be programmed or configured to: determine that a fraudulent transaction is associated with an account associated with the user; and update the device score based on determining the fraudulent transaction is associated with the account associated with the user.

In some non-limiting aspects or embodiments, the system may include a computing device associated with the user, the computing device including at least one processor that may be programmed or configured to: display, on a display of the computing device associated with the user, a local authentication request in response to receiving the device authentication request message; receive a local authentication response as input at the computing device associated with the user; and transmit a device authentication response based on receiving the local authentication response.

According to some non-limiting aspects or embodiments, a computer program product for authenticating devices may include at least one non-transitory computer-readable medium, the non-transitory computer-readable medium including one or more instructions that, when executed by at least one processor cause the at least one processor to: receive a request for a device authentication identifier of an account of a user; transmit a device authentication request message via a frame embedded in a webpage of a merchant website, the device authentication request message comprising challenge data associated with a challenge; receive a device authentication response message via the frame embedded in the webpage of the merchant website based on the device authentication request message, the device authentication response message comprising challenge response data associated with a challenge response; transmit a device authentication identifier message comprising the device authentication identifier associated with the account of the user based on the device authentication response message; receive a transaction request message associated with a transaction, including: the device authentication identifier, and transaction data associated with the transaction, determine a device score associated with the account of the user based on the device authentication identifier; and generate an authorization request message based on the transaction data and the device score.

In some non-limiting aspects or embodiments, the computer program product may include one or more instructions that may cause the at least one processor to: transmit the authorization request message to an issuer system; receive an authorization response message from the issuer system, the authorization response message generated in response to receiving the authorization request message; and update the device score based on disposition of the transaction.

According to some non-limiting aspects or embodiments, the computer program product may include one or more instructions that cause the at least one processor to: receive a public key from a computing device associated with a user to register the computing device with the account associated with the user, the account further associated with the device score; wherein the one or more instructions that cause the at least one processor to register the computing device with an account associated with the user cause the at least one processor to set the device score to a default value associated with a default score.

In some non-limiting aspects or embodiments, the computer program product may include the one or more instructions that cause the at least one processor to: determine that a second computing device was previously registered with the account associated with the user, wherein the one or more instructions that cause the at least one processor to register the computing device with the account associated with the user cause the at least one processor to set the device score to a value of an existing device score of the second computing device.

According to some non-limiting aspects or embodiments, the computer program product may include the one or more instructions that cause the at least one processor to: in response to updating the device score, transmit the device score and a transaction response message to a computing device associated with a merchant, wherein the instructions that cause the at least one processor to update the device score based on the disposition of the transaction, cause the at least one processor to: determine whether a chargeback occurred or did not occur within a period of time after the transaction was settled; and update the device score based on determining whether the chargeback occurred or there was no chargeback within the period of time.

In some non-limiting aspects or embodiments, the computer program product may include one or more instructions that cause the at least one processor to: receive an authorization response message; determine that the transaction is declined based on the authorization response message; and update the device score based on determining that the transaction is declined based on the authorization response message.

According to some non-limiting aspects or embodiments, the computer program product may include one or more instructions that cause the at least one processor to: determine that a fraudulent transaction is associated with an account associated with the user; and update the device score based on determining the fraudulent transaction is associated with the account associated with the user.

In some non-limiting aspects or embodiments, the computer program product may include one or more instructions that cause the at least one processor to cause a computing device associated with the user to: display, on a display of the computing device associated with the user, a local authentication request in response to receiving the device authentication request message; receive a local authentication response as input at the computing device associated with the user; and transmit a device authentication response based on receiving the local authentication response.

According to another embodiment, provided is a computer-implemented method for authenticating devices, the computer-implemented method comprising: receiving, with at least one processor, a request for a device authentication identifier for an account of a user; transmitting, with at least one processor, a device authentication request message via a pop-up browser window instantiated from code in a webpage of a merchant website, wherein the pop-up browser window includes webpage data from a domain separate from a domain that provides the merchant website, the device authentication request message comprising challenge data associated with a challenge; receiving, with at least one processor, a device authentication response message via the pop-up window based on the device authentication request message, the device authentication response message comprising challenge response data associated with a challenge response; transmitting, with at least one processor, a device authentication identifier message comprising the device authentication identifier associated with the account of the user based on the device authentication response message; receiving, with at least one processor, a transaction request message associated with a transaction, comprising: the device authentication identifier, and transaction data associated with the transaction, determining a device score associated with the account of the user based on the device authentication identifier; and generating, with at least one processor, an authorization request message based on the transaction data and the device score.

Further non-limiting aspects or embodiments are set forth in the following numbered clauses:

Clause 1: A computer-implemented method for authenticating devices, the computer-implemented method comprising: receiving, with at least one processor, a request for a device authentication identifier of an account of a user; transmitting, with at least one processor, a device authentication identifier request message via a frame embedded in a webpage of a merchant website, the device authentication identifier request message comprising challenge data associated with a challenge; receiving, with at least one processor, a device authentication response message via the frame embedded in the webpage of the merchant website based on the device authentication request message, the device authentication response message comprising challenge response data associated with a challenge response; transmitting, with at least one processor, a device authentication identifier message comprising the device authentication identifier associated with the account of the user based on the device authentication response message; receiving, with at least one processor, a transaction request message associated with a transaction, comprising: the device authentication identifier, and transaction data associated with the transaction, determining that a device score associated with the account of the user corresponds to the device authentication identifier; and generating, with at least one processor, an authorization request message based on the transaction data and the device score.

Clause 2: The computer-implemented method according to clause 1, further comprising: transmitting, with at least one processor, the authorization request message to an issuer system; receiving, with at least one processor, an authorization response message from the issuer system, the authorization response message generated in response to receiving the authorization request message; and updating, with at least one processor, the device score based on disposition of the transaction.

Clause 3: The computer-implemented method according to clauses 1 or 2, further comprising: receiving, with at least one processor, a public key from a computing device associated with a user to register the computing device with the account associated with the user, the account further associated with the device score; wherein, when registering the computing device with an account associated with the user, the device score is set to a default value associated with a default score.

Clause 4: The computer-implemented method according to any of clauses 1-3, further comprising: determining, with at least one processor, that a second computing device was previously registered with the account associated with the user, transmitting, with at least one processor, a new device registration message to the second computing device including a prompt to verify that the computing device is permitted to be registered; receiving, with at least one processor a registration response message including an indication as to whether the computing device is permitted to be registered in association with the second computing device; and determining, with at least one processor, that the computing device is permitted to be registered based on the indication included in the registration response message, wherein, when registering the computing device with the account associated with the user, the device score is set to a value based on a value of an existing device score of the second computing device after determining that the computing device is permitted to be registered in association with the second computing device.

Clause 5: The computer-implemented method according to any of clauses 1-4, further comprising: in response to updating the device score, transmitting, with at least one processor, the device score data associated with the device score and a transaction response message to a computing device associated with a merchant, wherein updating the device score based on the disposition of the transaction further comprises: determining whether a chargeback occurred or did not occur within a period of time after the transaction was settled; and updating the device score based on determining whether the chargeback occurred or there was no chargeback within the period of time.

Clause 6: The computer-implemented method according to any of clauses 1-5, further comprising: receiving, with at least one processor an authorization response message; determining, with at least one processor, that the transaction is not approved based on the authorization response message; and updating, with at least one processor, the device score based on determining that the transaction is declined based on the authorization response message.

Clause 7: The computer-implemented method according to any of clauses 1-6, further comprising: determining, with at least one processor, that a fraudulent transaction is associated with an authentication application; and updating, with at least one processor, the device score based on determining the fraudulent transaction is associated with the authentication application.

Clause 8: The computer-implemented method according to any of clauses 1-7, wherein the computing device associated with the user is configured to: display, on a display of the computing device associated with the user, a local authentication request in response to receiving the device authentication request message; receive a local authentication response as input at the computing device associated with the user; and transmit a device authentication response based on receiving the local authentication response.

Clause 9: A system for authenticating devices, the system comprising: at least one processor programmed or configured to: receive a request for a device authentication identifier of an account of a user; transmit a device authentication request message via a frame embedded in a webpage of a merchant website, the device authentication request message comprising challenge data associated with a challenge; receive a device authentication response message via the frame embedded in the webpage of the merchant website based on the device authentication request message, the device authentication response message comprising challenge response data associated with a challenge response; transmit a device authentication identifier message comprising the device authentication identifier associated with the account of the user based on the device authentication response message; receive a transaction request message associated with a transaction, comprising: the device authentication identifier, and transaction data associated with the transaction, determine a device score associated with the account of the user based on the device authentication identifier; and generate an authorization request message based on the transaction data and the device score.

Clause 10: The system according to clause 9, wherein the at least one processor is programmed or configured to: transmit the authorization request message to an issuer system; receive an authorization response message from the issuer system, the authorization response message generated in response to receiving the authorization request message; and update the device score based on disposition of the transaction.

Clause 11: The system according to clauses 9 or 10, wherein the at least one processor is programmed or configured to: receive a public key from a computing device associated with a user to register the computing device with the account associated with the user, the account further associated with the device score; wherein, when registering the computing device with an account associated with the user, the at least one processor is programmed or configured to set the device score to a default value associated with a default score.

Clause 12: The system according to any of clauses 9-11, wherein the at least one processor is programmed or configured to: determine that a second computing device was previously registered with the account associated with the user, wherein, when registering the computing device with the account associated with the user, the at least one processor is programmed or configured to set the device score to a value based on an existing device score of the second computing device.

Clause 13: The system according to any of clauses 9-12, wherein the at least one processor is programmed or configured to: in response to updating the device score, transmit the device score and a transaction response message to a computing device associated with a merchant, wherein when updating the device score based on the disposition of the transaction, the at least one processor is programmed or configured to: determine whether a chargeback occurred or did not occur within a period of time after the transaction was settled; and update the device score based on determining whether the chargeback occurred or there was no chargeback within the period of time.

Clause 14: The system according to any of clauses 9-13, wherein the at least one processor is programmed or configured to: receive an authorization response message; determine that the transaction is declined or approved based on the authorization response message; and update the device score based on determining that the transaction is declined or approved based on the authorization response message.

Clause 15: The system according to any of clauses 9-14, wherein the at least one processor is programmed or configured to: determine that a fraudulent transaction is associated with a device associated with the user; and update the device score based on determining the fraudulent transaction is associated with the device associated with the user.

Clause 16: The system according to any of clauses 9-15, wherein a computing device associated with the user comprises at least one processor programmed or configured to: display, on a display of the computing device associated with the user, a local authentication request in response to receiving the device authentication request message; receive a local authentication response as input at the computing device associated with the user; and transmit a device authentication response based on receiving the local authentication response.

Clause 17: A computer program product for authenticating devices, the computer program product comprising at least one non-transitory computer-readable medium comprising one or more instructions that, when executed by at least one processor cause the at least one processor to: receive a request for a device authentication identifier of an account of a user; transmit a device authentication request message via a frame embedded in a webpage of a merchant website, the device authentication request message comprising challenge data associated with a challenge; receive a device authentication response message via the frame embedded in the webpage of the merchant website based on the device authentication request message, the device authentication response message comprising challenge response data associated with a challenge response; transmit a device authentication identifier message comprising the device authentication identifier associated with the account of the user based on the device authentication response message; receive a transaction request message associated with a transaction, comprising: the device authentication identifier, and transaction data associated with the transaction, determine a device score associated with the device authentication identifier; and generate an authorization request message based on the transaction data and the device score.

Clause 18: The computer program product according to clause 17, wherein the one or more instructions further cause the at least one processor to: transmit the authorization request message to an issuer system; receive an authorization response message from the issuer system, the authorization response message generated in response to receiving the authorization request message; and update the device score based on disposition of the transaction.

Clause 19: The computer program product according to clauses 17 or 18, wherein the one or more instructions further cause the at least one processor to: receive a public key from a computing device associated with a user to register the computing device with the account associated with the user, the account further associated with the device score; wherein, when registering the computing device with an account associated with the user, the at least one processor is programmed or configured to set the device score to a default value associated with a default score.

Clause 20: The computer program product according to any of clauses 17-19, wherein the one or more instructions further cause the at least one processor to: determine that a second computing device was previously registered with the account associated with the user, wherein, when registering the computing device with the account associated with the user, the at least one processor is programmed or configured to set the device score to a value of an existing device score of the second computing device.

Clause 21: The computer program product according to any of clauses 17-20, wherein the one or more instructions further cause the at least one processor to: in response to updating the device score, transmit the device score and a transaction response message to a computing device associated with a merchant, wherein when updating the device score based on the disposition of the transaction, the at least one processor is programmed or configured to: determine whether a chargeback occurred or did not occur within a period of time after the transaction was settled; and update the device score based on determining whether the chargeback occurred or did not occur within the period of time.

Clause 22: The computer program product according to any of clauses 17-21, wherein the one or more instructions further cause the at least one processor to: receive an authorization response message; determine that the transaction is declined or accepted based on the authorization response message; and update the device score based on determining that the transaction is declined or accepted based on the authorization response message.

Clause 23: The computer program product according to any of clauses 17-22, wherein the one or more instructions further cause the at least one processor to: determine that a fraudulent transaction is associated with an account associated with the user; and update the device score based on determining the fraudulent transaction is associated with the account associated with the user.

Clause 24: The computer program product according to any of clauses 17-23, wherein the one or more instructions further cause the at least one processor to cause a computing device associated with the user to: display, on a display of the computing device associated with the user, a local authentication request in response to receiving the device authentication request message; receive a local authentication response as input at the computing device associated with the user; and transmit a device authentication response based on receiving the local authentication response.

Clause 25: A computer-implemented method for authenticating devices, the computer-implemented method comprising: receiving, with at least one processor, a request for a device authentication identifier for an account of a user; transmitting, with at least one processor, a device authentication request message via a pop-up browser window instantiated from code in a webpage of a merchant website, wherein the pop-up browser window includes webpage data from a domain separate from a domain that provides the merchant website, the device authentication request message comprising challenge data associated with a challenge; receiving, with at least one processor, a device authentication response message via the pop-up window based on the device authentication request message, the device authentication response message comprising challenge response data associated with a challenge response; transmitting, with at least one processor, a device authentication identifier message comprising the device authentication identifier associated with the account of the user based on the device authentication response message; receiving, with at least one processor, a transaction request message associated with a transaction, comprising: the device authentication identifier, and transaction data associated with the transaction, determining a device score associated with the account of the user based on the device authentication identifier; and generating, with at least one processor, an authorization request message based on the transaction data and the device score.

These and other features and characteristics of the presently disclosed subject matter, as well as the methods of operation and functions of the related elements of structures and the combination of parts and economies of manufacture, will become more apparent based on the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIG. 3 is a flow diagram of non-limiting aspects or embodiments of a process for authenticating devices.

DESCRIPTION

Figure 1:
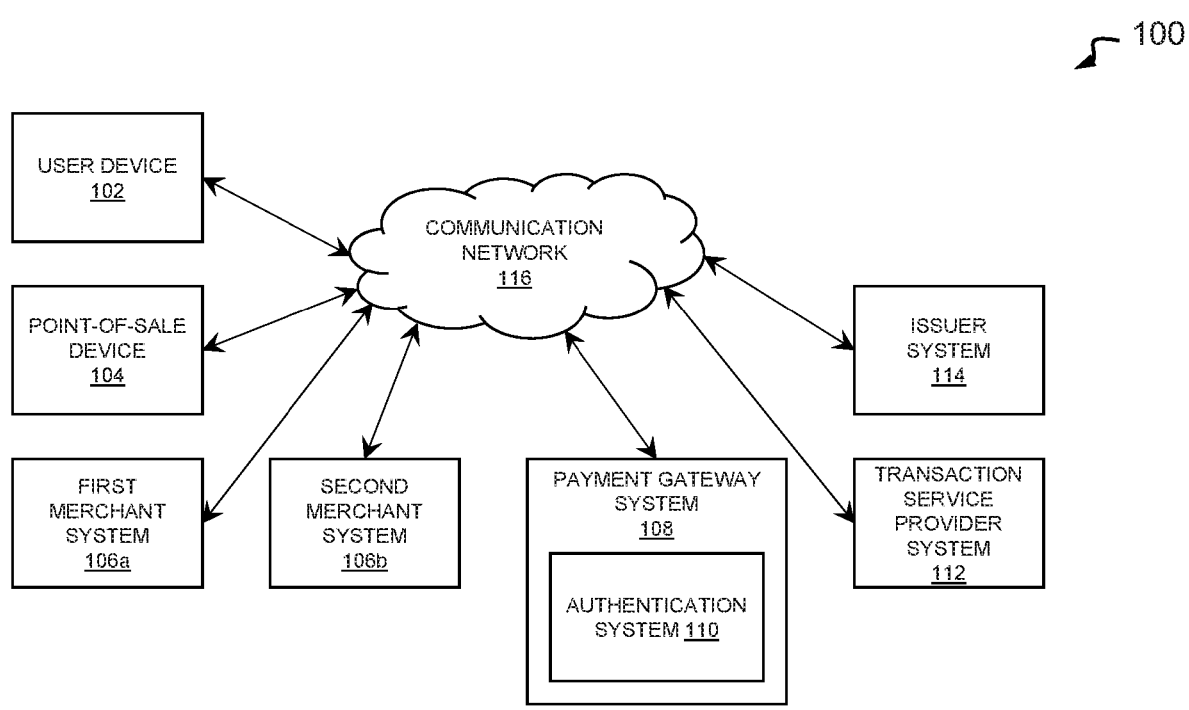
FIG. 1 is a diagram of non-limiting aspects or embodiments of a system for authenticating devices.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting embodiments, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions that the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.). Further, multiple computers, e.g., servers, or other computerized devices, such as an autonomous vehicle including a vehicle computing system, directly or indirectly communicating in the network environment may constitute a "system" or a "computing system."

As used herein, the terms "client" and "client device" may refer to one or more computing devices, such as processors, storage devices, and/or similar computer components, that access a service made available by a server. In some non-limiting embodiments, a "client device" may refer to one or more devices that facilitate payment transactions, such as POS devices and/or POS systems used by a merchant. In some non-limiting embodiments, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components, that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided are improved systems, methods, and computer program products for authenticating a device. In some non-limiting aspects or embodiments, a user device may generate and/or be assigned an encryption key pair (e.g., a private key and/or a public key) and/or may establish a shared secret with a second device (e.g., a merchant device, a payment gateway, a transaction service provider system, and/or the like). Once a transaction is initiated, the user device may be authenticated as being the actual device being communicated with (e.g., a device may be given a challenge to respond to that, when answered correctly, indicates the device is the authentic user device). In some non-limiting embodiments, this may occur during a transaction either directly (e.g., the challenge may be transmitted from the merchant system and/or the transaction service provider system to the user device) or indirectly (e.g., the transaction service provider system may transmit the challenge to the merchant system for forwarding to the user device). Upon successful or unsuccessful authentication of the user device, a device score associated with the user device may be updated, the device score associated with the likelihood that the user device is indeed the user device and not an imitation thereof.

As a result of authenticating the user device during the transaction prior to transmitting an authorization request to an issuer system, and/or other systems, an authorization request may be generated including the device score and/or an indication that the user device was authenticated. This may, in some instances, reduce and/or eliminate the need for communications outside the context of a transaction to authenticate a device. For example, an issuer system may be able to forego authentication of a transaction (e.g., by calling a user to verify they are indeed the individual performing the transaction and/or by verifying the user device out-of-band) and determine that the user is in fact the user who registered the device based on the score.

By virtue of authenticating a device during a transaction, and including a device score with an authorization request during a transaction, the issuer system may determine whether to authorize payment based on the likelihood that the device is indeed a registered device operated by a user based on the device score and/or the indication as to whether the device initiating the transaction is a valid device or an invalid device. This, in turn, enables issuers, acquirers, merchants, and/or the like to better identify fraudulent transactions and reduce transaction processing times. Additionally or alternatively, systems and methods as described herein may be used to authenticate devices where the identity of a user must be verified. For example, where access to a website is age-restricted (e.g., to individuals over twenty-one years of age, and/or the like), authentication may be performed according to some of the embodiments described herein.

Referring now to FIG. 1, illustrated is a diagram of a system 100 for authenticating devices according to non-limiting embodiments. As illustrated in FIG. 1, the system 100 comprises a user device 102, a point-of-sale (POS) device 104, a first merchant system 106a, a second merchant system 106b, a payment gateway system 108, an authentication system 110, a transaction service provider system 112, an issuer system 114, and a communication network 116. The user device 102, POS device 104, first merchant system 106a, second merchant system 106b, payment gateway system 108, authentication system 110, transaction service provider system 112, and/or issuer system 114 may be in communication via the communication network 116 and/or one or more wired connections, wireless connections, or a combination of wired and wireless connections. Although FIG. 1 shows all of the components of the system 100 communicating with the communication network 116, it will be appreciated that multiple communication networks may be used and that all components may not communicate through the same network.

The user device 102 may include a computing device capable of communicating data to and/or from the POS device 104, the first merchant system 106a, the second merchant system 106b, the payment gateway system 108, the authentication system 110, the transaction service provider system 112, and/or the issuer system 114 via the communication network 116. The user device 102 may be configured to receive information from the POS device 104, the first merchant system 106a and/or, the second merchant system 106b via a communication connection (e.g., an NFC communication connection, an RFID communication connection, a Bluetooth® communication connection, and/or the like) and transmit information to the POS device 104, the first merchant system 106a, and/or the second merchant system 106b. In some non-limiting aspects or embodiments, the user device 102 may be associated with a user (e.g., a customer).

The POS device 104 may include one or more computing devices capable of communicating data to and/or from the user device 102, the first merchant system 106a, the second merchant system 106b, the payment gateway system 108, the authentication system 110, the transaction service provider system 112, and/or the issuer system 114 via the communication network 116 or other network. For example, the POS device 104 may include a device capable of receiving information from user device 102 and/or the POS device 104 via a communication connection, and transmitting information to user device 102 and/or the POS device 104, and/or otherwise communicating information to and/or from the user device 102 and/or the POS device 104. In some non-limiting aspects or embodiments, the POS device 104 may be associated with a merchant as described herein. In some non-limiting aspects or embodiments, the POS device 104 may be a mobile POS device (e.g., a hand-held computing device such as a smartphone) capable of communicating information and/or data from one or more locations.

The first merchant system 106a and the second merchant system 106b may each include one or more computing devices capable of communicating data to and/or from the user device 102, the POS device 104, the payment gateway system 108, the authentication system 110, the transaction service provider system 112, and/or the issuer system 114 via the communication network 116 or other network. In some non-limiting aspects or embodiments, the first merchant system 106a and the second merchant system 106b may include a computing device, such as a server, a group of servers, a client device, a group of client devices, and/or other like devices. In some non-limiting aspects or embodiments, the POS device 104 may be part of either of the first merchant system 106a and/or the second merchant system 106b. In some non-limiting embodiments, the first merchant system 106a and the second merchant system 106b may be associated with one or more merchants as described herein.

The payment gateway system 108 may include one or more computing devices capable of communicating data to and/or from the user device 102, the POS device 104, the first merchant system 106a, the second merchant system 106b, the authentication system 110, the transaction service provider system 112, and/or the issuer system 114 via the communication network 116 or other network. For example, the payment gateway system 108 may include a server, a group of servers, and/or other like computing devices.

The authentication system 110 may include one or more computing devices capable of communicating data to and/or from the user device 102, the POS device 104, the first merchant system 106a, the second merchant system 106b, the payment gateway system 108, the transaction service provider system 112, and/or the issuer system 114 via the communication network 116 or other network. For example, the authentication system 110 may include a server, a group of servers, and/or other like computing devices. In some non-limiting embodiments, the authentication system 110 be independent of, or included in, the payment gateway system 108. Additionally or alternatively, the authentication system 110 may be included in one or more of the first merchant system 106a or the second merchant system 106b, the transaction service provider system 112, and/or the issuer system 114. The authentication system 110 may be associated with a payment gateway and/or a transaction service provider as described herein.

The transaction service provider system 112 may include one or more computing devices capable of communicating data to and/or from the user device 102, the POS device 104, the first merchant system 106a, the second merchant system 106b, the payment gateway system 108, the authentication system 110 and/or the issuer system 114 via the communication network 116 or another network. For example, the transaction service provider system 112 may include a server (e.g., a transaction processing server), a group of servers, and/or other like devices. In some non-limiting aspects or embodiments, the transaction service provider system 112 may be associated with a transaction service provider as described herein.

The issuer system 114 may include one or more computing devices capable of communicating data to and/or from the user device 102, the POS device 104, the first merchant system 106a, the second merchant system 106b, the payment gateway system 108, the authentication system 110, and/or the transaction service provider system 112 via the communication network 116 or another network. For example, the issuer system 114 may include a server, a group of servers, and/or other like devices. In some non-limiting aspects or embodiments, the issuer system 114 may be associated with an issuer institution that issued a payment account or instrument (e.g., a credit account, a debit account, a credit card, a debit card, etc.) to a user (e.g., a user associated with the user device 102, etc.).

The communication network 116 may include one or more wired and/or wireless networks. For example, the communication network 116 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems, devices, and networks shown in FIG. 1 are provided as an example. There may be additional systems, devices and/or networks, fewer systems, devices, and/or networks, different systems, devices and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally or alternatively, a set of systems or a set of devices (e.g., one or more systems, one or more devices) of system 100 may perform one or more functions described as being performed by another set of systems or another set of devices of system 100.

In some non-limiting aspects or embodiments, transaction data associated with a transaction may include transaction parameters associated with the transaction, such as payment transactions initiated and/or conducted with a computing device (e.g., via an internet browser of a computing device), with an electronic wallet application, and/or the like. Non-limiting examples of transaction parameters include: electronic wallet card data associated with a payment device and/or account identifier, decision data associated with a decision (e.g., a decision to approve or deny a transaction authorization request), authorization data associated with an authorization response (e.g., an approved spending limit, an approved transaction value, and/or the like), a PAN, an authorization code (e.g., a PIN, password, etc.), data associated with a transaction amount (e.g., an approved limit, a transaction value, etc.), data associated with a transaction date and time, data associated with a conversion rate of a currency, data associated with a merchant type (e.g., goods, grocery, fuel, and/or the like), data associated with an acquiring institution country, data associated with an identifier of a country associated with the payment device or account, data associated with a response code, data associated with a merchant identifier (e.g., a merchant name, a merchant location, and/or the like), data associated with a type of currency of funds stored in association with the PAN, and/or the like.

Figure 2:
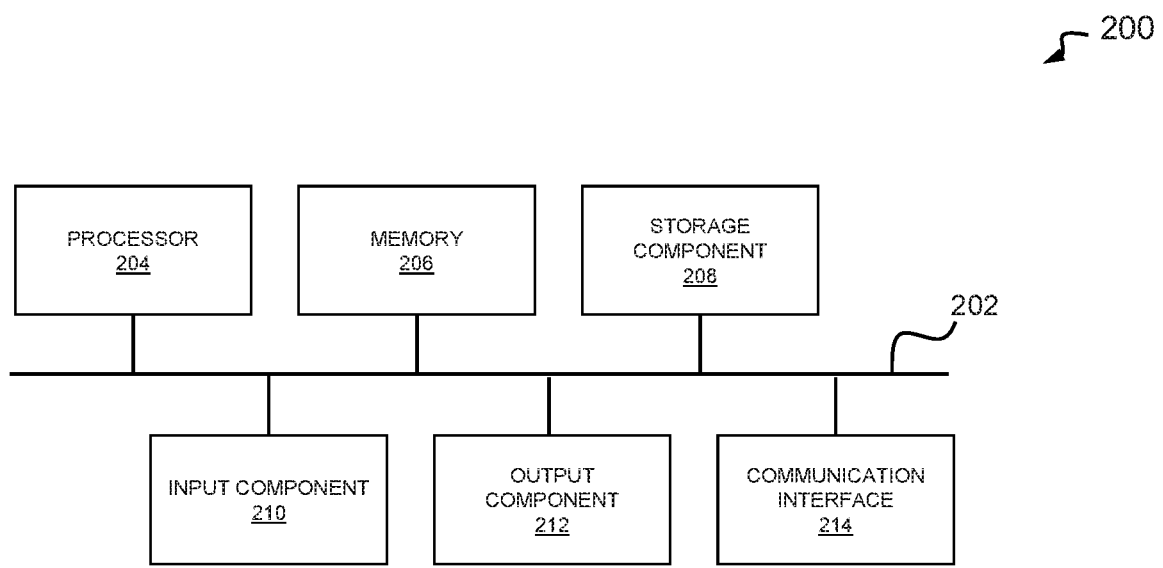
FIG. 2 is a diagram of non-limiting aspects or embodiments of components of one or more devices and/or one or more systems of FIG. 1.

Referring now to FIG. 2, illustrated is a diagram of example components of a device 200. The device 200 may correspond to one or more components of the user device 102, the POS device 104, the first merchant system 106a, the second merchant system 106b, the payment gateway system 108, the transaction service provider system 112, and/or the issuer system 114. As shown in FIG. 2, the device 200 may include a bus 202, a processor 204, memory 206, a storage component 208, an input component 210, an output component 212, and a communication interface 214.

The bus 202 may include a component that permits communication among the components of the device 200. In some non-limiting aspects or embodiments, the processor 204 may be implemented in hardware, software, or a combination of hardware and software. For example, the processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. The memory 206 may include random access memory (RAM), read-only memory (ROM), and/or another type of dynamic or static storage device (e.g., flash memory, magnetic memory, optical memory, etc.) that stores information and/or instructions for use by processor 204.

The storage component 208 may store information and/or software related to the operation and use of the device 200. For example, the storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

The input component 210 may include a component that permits device 200 to receive information, such as via user input (e.g., a touchscreen display, a keyboard, a keypad, a mouse, a button, a switch, a microphone, a camera, etc.). Additionally or alternatively, the input component 210 may include a sensor for sensing information (e.g., a global positioning system (GPS) component, an accelerometer, a gyroscope, an actuator, etc.). The output component 212 may include a component that provides output information from device 200 (e.g., a display, a speaker, one or more light-emitting diodes (LEDs), etc.).

The communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. The communication interface 214 may permit the device 200 to receive information from another device and/or provide information to another device. For example, the communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

The device 200 may perform one or more processes described herein. The device 200 may perform these processes based on the processor 204 executing software instructions stored by a computer-readable medium, such as the memory 206 and/or the storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into the memory 206 and/or the storage component 208 from another computer-readable medium or from another device via the communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The memory 206 and/or the storage component 208 may include data storage or one or more data structures (e.g., a database, etc.). The device 200 may be capable of receiving information from, storing information in, communicating information to, or searching information stored in the data storage or one or more data structures in the memory 206 and/or the storage component 208. For example, the information may include encryption data, input data, output data, transaction data, account data, or any combination thereof.

The number and arrangement of components shown in FIG. 2 are provided as an example. In some non-limiting aspects or embodiments, the device 200 may include additional components, fewer components, different components, or differently arranged components than those shown in FIG. 2. Additionally or alternatively, a set of components (e.g., one or more components) of the device 200 may perform one or more functions described as being performed by another set of components of the device 200.

Referring now to FIG. 3, illustrated is a flow diagram of a process 300 for authenticating devices according to some non-limiting aspects or embodiments of the present disclosure. In some non-limiting aspects or embodiments, one or more of the steps of process 300 may be performed (e.g., completely, partially, etc.) by an authentication system 110 (e.g., an authentication system 110 included in a payment gateway system 108 and/or the like). In some non-limiting aspects or embodiments, one or more of the steps and/or functions described with respect to process 300 may be performed (e.g., completely, partially, etc.) by the user device 102, the POS device 104, the first merchant system 106a or the second merchant system 106b, and/or the issuer system 114. Additionally or alternatively, in some non-limiting embodiments, one or more of the steps of process 300 may be performed (e.g., completely, partially, etc.) by an authentication system 110 included in a first merchant system 106a, a second merchant system 106b, a transaction service provider system 112, and/or an issuer system 114.

As illustrated in FIG. 3, at step 302, process 300 may include registering a user device 102. In some non-limiting embodiments, a user device 102 may register with an authentication system 110. For example, the user device 102 may register with the authentication system 110 by transmitting registration data associated with registration of the user device 102 to the authentication system 110. In some non-limiting embodiments, the authentication system 110 may be maintained by a first merchant system 106a, a second merchant system 106b, a payment gateway system 108, a transaction service provider system 112, and/or an issuer system 114.

In some non-limiting embodiments, registration data associated with registration of a user device 102 may include one or more of a public key of the user device 102, a private key of the user device 102, and/or a unique device identifier of the user device 102 (e.g., identification data associated with identification of a device, a media access control (MAC) address, a unique application identifier of an authentication application stored on the user device 102, and/or the like). For example, the user device 102 may generate the public key and/or the private key to encrypt and/or decrypt data transmitted to and/or received from the user device 102, a first merchant system 106a, a second merchant system 106b, a payment gateway system 108, an authentication system 110, a transaction service provider system 112, and/or an issuer system 114. In such an example, the public key and/or the private key may be generated by the authentication application executed on the user device 102. In another example, the user device 102 may be assigned the public key and/or the private key by the authentication system 110. In some non-limiting embodiments, registration data may include data used to derive and establish a shared secret between the user device 102 and the authentication system 110. In such examples, the public key, the private key, the unique device identifier, and/or the shared secret may be associated with the device score of the user device 102.

In some non-limiting embodiments, the authentication system 110 may register the user device 102. For example, the authentication system 110 may register the user device 102 with one or more accounts (e.g., an account associated with a first merchant system 106a and/or an account associated with a second merchant system 106b). In such an example, the authentication system 110 may register the user device 102 with the one or more accounts by linking one or more unique device identifiers of the user device 102 (e.g., a unique application identifier associated with an authentication application installed on user device 102, a media access control (MAC) address of the user device 102, an identifier assigned to the user device 102 by the authentication system 110, and/or the like) with the one or more accounts. In another example, the authentication system 110 may register the user device 102 by linking the one or more unique device identifiers of the user device 102 with device score data associated with a device score (e.g., a value associated with an indication as to the likelihood that communications with the user device 102 are authentic, a value associated with an indication as to the likelihood that transactions involving the user device 102 will later be subject to a chargeback transaction, a value associated with a confidence level indicating the likelihood that the device score accurately reflects the likelihood that communications with the user device 102 are authentic, and/or the like). For example, the authentication system 110 may determine the device score data associated with the device score for the user device 102 and, upon determination, may link the user device 102 with the device score by associating the unique device identifier with the device score data maintained by the authentication system 110. In this way, the authentication system 110 may determine and/or update the device score linked to the user device 102 based on activity (e.g., transactions involving the user device 102) between the user device 102 and both the first merchant system 106a and the second merchant system 106b.

In some non-limiting embodiments, registration of the user device 102 may include determining the device score data associated with a device score. For example, the authentication system 110 may determine that the device score linked to the user device corresponds to a default device score. In another example, the authentication system 110 may determine that the device score linked to the user device 102 is associated with a device score linked to another device. For example, the authentication system 110 may determine that the device score linked to the user device 102 is associated with the device score linked to a user device 102 that was previously registered with the authentication system 110 (e.g., the same user device 102 and/or a different user device 102). In such an example, after receiving registration data associated with registration of the user device 102, the authentication system 110 may transmit a new device registration message to the user device 102 that was previously registered with authentication system 110. The authentication system 110 may then receive a new device response message from the user device 102 that was previously registered with authentication system 110 indicating whether the user device 102 is permitted to register with the authentication system 110. Where the new device response message includes an indication that the user device 102 is permitted to register with the authentication system 110, the authentication system 110 may determine the device score of the user device based on the device score of the user device 102 that was previously registered with authentication system 110 (e.g., that the device score linked to the user device 102 is greater than, equal to, or less than the device score linked to the user device 102 that was previously registered with authentication system 110). Where the authentication response message includes an indication that the user device 102 is not permitted to register with the authentication system 110, the authentication system 110 may forego registering the user device 102 and/or may forego determining the device score of the user device 102 based on the device score of the user device 102 that was previously registered with authentication system 110. In some non-limiting embodiments, the device score linked to the user device 102 may be updated (e.g., incremented or decremented) to generate a device score that is linked with the user device 102 and/or the authentication application based on updates to the device score associated with the user device 102 that was previously registered with authentication system 110. Similarly, the device score linked to the user device 102 that was previously registered with authentication system 110 may be updated based on updates to the device score associated with the user device 102. In this way, the device score of the user device 102 may be linked to the device score of the user device 102 that was previously registered with authentication system 110.

In some non-limiting embodiments, the device score linked to the user device 102 may be determined based on whether the user device 102 is registering from an internet protocol (IP) address associated with a user device 102 that was previously registered with authentication system 110 using that IP address. For example, the authentication system 110 may determine that the device score linked to the user device 102 is associated with a value greater than a value of a default score where the user device 102 is registering from an IP address that the user device 102 that was previously registered with authentication system 110 used to register with the authentication system 110. In another example, the authentication system 110 may determine that the device score linked to the user device 102 is associated with a value less than or equal to a value of a default score where the user device 102 is registering from an IP address that was not used during a previous registration.

In some non-limiting embodiments, the authentication system 110 may determine the device score linked to the user device 102 based on determining whether the IP address associated with the user device 102 used during a transaction geolocates (e.g., is associated with a geographic area) to an area where one or more transactions of an account associated with the user device 102 were initiated. For example, where authentication system 110 determines that user device 102 geolocates to an area where one or more transactions of an account associated with the user device 102 were initiated, authentication system 110 may determine that the device score linked to user device 102 is a value greater than or less than the default score that user device 102 would be linked to. In another example, where authentication system 110 determines that user device 102 geolocates to an area where one or more transactions of an account associated with the user device 102 were not initiated, authentication system 110 may forego determining that the device score is a value greater than or less than the default score.

In some non-limiting embodiments, the user device 102 may transmit the registration data associated with registration of the user device 102 to the authentication system 110 after authenticating the user at user device 102.

In some non-limiting embodiments, the user device 102 may authenticate a user operating the user device 102 by displaying a local authentication request (e.g., a prompt indicating a request for the user to provide input at the user device 102 to authenticate themselves), by querying a security device associated with the user device 102 such as a hardware token, a security key stored in a universal serial bus (USB) key, by determining a token stored in storage segmented from the main memory of the user device 102, and/or the like. For example, the user device 102 may display the local authentication request and, in response, the user device 102 may receive input associated with a local authentication response. The local authentication response may include data received as input at the user device 102 such as, without limitation, identifying data associated with an identifier of a user identity (e.g., a personal identification number (PIN)), fingerprint data associated with a fingerprint of the user (e.g., a biometric measurement captured by a fingerprint scanner located on or otherwise in communication with the user device 102), facial image data associated with a facial image of the user (e.g., received via a two dimension (2D) and/or a three dimension (3D) camera associated with the user device 102), and/or the like. The local authentication response may be compared to identifying data associated with an identifier of a user, the identifying data maintained by user device 102 in memory. Based on the comparison of the local authorization response and the identifying data, the user device 102 may authenticate the user. In some non-limiting embodiments, after authenticating the user, user device 102 may transmit a device authentication response message to the authentication system 110 to indicate that the user was authenticated.

As further illustrated in FIG. 3, at step 304, process 300 may include authenticating a device during a transaction. In some non-limiting embodiments, authenticating a device (e.g., a user device 102) during a transaction may occur prior to or during the transmission of product data associated with one or more products from a first merchant system 106a or a second merchant system 106b to the user device 102, prior to or during transmission of a transaction request message including transaction data associated with a transaction and/or transaction data associated with the transaction from the user device 102 to the first merchant system 106a or the second merchant system 106b, prior to or during transmission of the transaction request message from the first merchant system 106a or the second merchant system 106b to a payment gateway system 108 and/or a transaction service provider system 112, and/or prior to or during transmission of an authorization request message from the payment gateway system 108 and/or the transaction service provider system 112 to an issuer system 114. In some non-limiting embodiments, once authenticated, the user device 102 and/or the first merchant system 106a or the second merchant system 106b may receive a device authentication identifier message including a device authentication identifier (e.g., a unique device identifier of user device 102 generated for use during one or more transactions by the authentication system 110, a device authentication token of user device 102, and/or the like) from the authentication system 110 to be used during the transaction to identify the user device 102.

In some non-limiting embodiments, the user device 102 may request first website data associated with a first website maintained by a first merchant system 106a or a second merchant system 106b to initiate a transaction. The first website data may include data associated with rendering a webpage (e.g., a product page including product data associated with one or more products available for purchase). In some non-limiting embodiments, the user device 102 may display the one or more goods and/or services on an output component of the user device 102, such as a display screen. For example, the user device 102 may display the one or more goods and/or services available for purchase via the webpage based on the first website data. In such an example, the first merchant system 106a or the second merchant system 106b may transmit the first website data to the user device 102 to cause the user device 102 to display the webpage of the first website. In some non-limiting embodiments, the first website data may be used by the user device 102 (e.g., via a browser executed on the user device 102) to authenticate the user device 102, as described herein.

In some non-limiting embodiments, second website data associated with a second website may be used to authenticate the user device 102. For example, the user device 102 may communicate via a second webpage of the second website to authenticate itself with the first merchant system 106a or the second merchant system 106b, the second webpage embedded in the first webpage (e.g., with frames), as described in embodiments herein. In some non-limiting embodiments, the first website may be hosted by a first domain and the second website may be hosted by a second domain different from the first domain.

In some non-limiting embodiments, the user device 102 may be authenticated via a second webpage embedded in a first webpage. For example, second webpage data associated with the second webpage rendered via a frame (e.g., an inline frame (iFrame), and/or the like) included in the first webpage may be transmitted to the user device 102. In such an example, the second webpage data may be transmitted from the authentication system 110 hosted by the payment gateway system 108. In some non-limiting embodiments, the user device 102 may establish communication with the authentication system 110 based on receiving the second webpage data to verify that the user device 102 is authentic. In some non-limiting embodiments, rendering the second webpage may include rendering an invisible second webpage via the frame to establish communication between the user device 102 and the authentication system 110 during authentication of the user device 102. When communicating via the invisible second webpage, authentication of the user device 102 may be silent (e.g., the user device 102 may not render an image which is visible to the user during authentication, the user device 102 may render an image indicating that authentication is occurring without requesting the user provide input to the user device 102, and/or the like).

In some non-limiting embodiments, the user device 102 may be authenticated via a second webpage presented in a separate browser window (e.g., a pop-up window) invoked from code within the first webpage. For example, in some non-limiting embodiments, second webpage data associated with a second webpage (e.g., a second webpage rendered via a pop-up window) may be transmitted to a user device 102 based on the first webpage data. In such an example, the first webpage data may include code configured to cause the web browser rendering the first webpage to open a new window and to retrieve the second webpage data associated with the second webpage. The second webpage data associated with the second webpage may be retrieved from a domain different from the domain that provided the first webpage.

In some non-limiting embodiments, the authentication system 110 may generate challenge data associated with the challenge. For example, the authentication system 110 may generate challenge data associated with a challenge based on receiving a device authentication identifier request message from a user device 102 and/or a transaction request message from a first merchant system 106a or a second merchant system 106b. The device authentication identifier request message may include a request for a device authentication identifier. Additionally or alternatively, the authentication system 110 may generate the challenge data based on receipt of a transaction request message at a payment gateway system 108. In some non-limiting embodiments, once the challenge data is generated, the authentication system 110 may transmit the challenge data to the user device 102 included in a device authentication request message. For example, the authentication system 110 may transmit the device authentication request message to the user device 102 via the second webpage to cause the user device 102 to generate and transmit a device authentication response message including challenge response data associated with a challenge response. Additionally or alternatively, the authentication system 110 may transmit the device authentication response message to the user device 102 via the first merchant system 106a and/or via the communication network 116 (e.g., by establishing communication with the user device 102 separate from the first or second webpages).

In some non-limiting embodiments, the user device 102 may generate the challenge response data associated with the challenge response included in the device authentication response message based on the challenge data associated with the challenge. For example, the user device 102 may generate the challenge response data associated with the challenge response included in the device authentication response message by digitally signing the challenge data (or data derived from the challenge data, such as a hash) with the private key of the user device 102. In some non-limiting embodiments, the user device 102 may encrypt the challenge data based on encryption data associated with a private key and/or a public key of the user device 102 to generate the challenge response data associated with the challenge response. In such an example, the user device 102 may digitally sign the challenge data by encrypting the challenge data (or data derived therefrom) with the private key to enable the authentication system 110 to determine that the user device 102 is authentic (e.g., by decrypting the encrypted challenge data with the public key of the user device 102). In some non-limiting embodiments, the user device 102 may prompt the user to authenticate themselves when generating the challenge response data. In such an example, the user device 102 may forego generating the challenge response data until the user is successfully authenticated at the user device 102 during a local authentication request. In some non-limiting embodiments, the user device 102 may include the challenge response data with transaction data prior to transmitting the transaction data to the first merchant system 106a or the second merchant system 106b.

In some non-limiting embodiments, the user device 102 may query a security device (e.g., a hardware token, a software token, and/or the like used to authenticate the user device 102) associated with the user device 102 when generating the challenge response data. For example, the user device 102 may generate the challenge response data based on data received from the security device. In some non-limiting embodiments, the user device 102 may include a unique device identifier associated with the user device 102 with the challenge response data associated with the challenge response. For example, where the user device 102 determines the transaction is being performed with the first merchant system 106a, the user device 102 may include a unique device identifier associated with the user device 102 and the first merchant system 106a in the transaction data and/or the challenge response data, whereas where the user device 102 determines the transaction is being performed with a second merchant system 106b, the user device 102 may include a unique device identifier associated with the user device 102 and the second merchant system 106b in the transaction data and/or the challenge response data via the device authentication response message. The user device 102 may then transmit the challenge response data to the first merchant system 106a, the second merchant system 106b, and/or the authentication system 110.

In some non-limiting embodiments, the challenge data associated with the challenge may be transmitted by the first merchant system 106a or the second merchant system 106b via a device authentication request message to the user device 102. For example, the first merchant system 106a or the second merchant system 106b may host an authentication system similar to authentication system 110. The authentication system may generate challenge data associated with a device challenge and transmit the device authentication request message including the challenge data associated with the challenge to the user device 102. For example, the authentication system 110 may generate challenge data and transmit the device authentication request message including the challenge data associated with the device challenge to the user device 102 based on an attempt by the user device 102 to login to the first webpage and/or based on receiving transaction data associated with a transaction from the user device 102. The user device 102 may then process the challenge data to generate challenge response data associated with a challenge response via a device authentication response message and transmit the device authentication response message to the first merchant system 106a or the second merchant system 106b, respectively. In some non-limiting embodiments, the challenge data may cause the user device 102 to prompt the user to authenticate themselves in accordance with a local authentication request. In such an example, the user device 102 may not generate challenge response data until the user is successfully authenticated at the user device 102.

In some non-limiting embodiments, the user device 102 may be authenticated by an authentication system 110. For example, the authentication system 110 may determine a user device 102 is authentic based on challenge response data associated with a challenge response received via a device authentication response message. In some non-limiting embodiments, the challenge response data associated with the challenge response may be compared to the challenge data associated with the challenge and/or registration data associated with registration of the user device 102 received during registration of a user device 102. For example, an authentication system 110 may verify a user device 102 as authentic by decrypting the challenge response data associated with the challenge with the public key associated with the user device 102 and comparing the decrypted challenge response data to the challenge data transmitted to the user device 102. In such an example, where the challenge response data is generated by digitally signing the challenge data (or data derived from the challenge data) with a private key of the user device 102, the challenge response data may be processed according to a digital signature verification algorithm to verify that the user of the user device 102 is in possession of the authentic private key. In some non-limiting embodiments, based on the comparison of the challenge response data that was decrypted and challenge data, the authentication system 110 may determine that a device that transmitted the challenge response data (and, in some non-limiting embodiments, the transaction request message) is or is not the user device 102 that was registered and, therefore, is or is not authentic.

In some non-limiting embodiments, a device authentication identifier associated with a user device 102 may be transmitted to the user device 102. For example, the device authentication identifier may be generated by the authentication system 110 and transmitted via a device authentication identifier message to the user device 102 based on successful authentication of the user device 102. In some non-limiting embodiments, the user device 102 may transmit the device authentication identifier to the first merchant system 106a or the second merchant system 106b with the transaction data associated with the transaction via the transaction request message. In some non-limiting embodiments, the first merchant system 106a or the second merchant system 106b may include the device authentication identifier in a transaction request message when generating the transaction request message during a transaction, as described herein.

In some non-limiting embodiments, the user device 102 may determine transaction data associated with a transaction. For example, in some non-limiting embodiments, a user device 102 may determine transaction data associated with a transaction based on product data associated with one or more products received via the first webpage and input received at the user device 102. In some non-limiting embodiments, the transaction data may include account data associated with an account maintained by an issuer system 114 on behalf of a user for making a payment to complete the transaction, address data associated with an address for delivery of the goods and/or services associated with the transaction, and/or the like. For example, a user device 102 may receive input identifying an account identifier, accountholder name, account expiration date, account verification number, a unique device identifier, and/or the like.

In some non-limiting embodiments, the user device 102 may transmit the transaction data associated with a transaction via a transaction request message. For example, the user device 102 may transmit the transaction data associated with the transaction via the transaction request message to the first merchant system 106a or the second merchant system 106b. In some non-limiting embodiments, the user device 102 may transmit the transaction request message after receiving a request from the first merchant system 106a or the second merchant system 106b for the transaction request message to complete the transaction. In some non-limiting embodiments, the transaction data transmitted via the transaction request message may further include the device authentication identifier associated with a user device 102. For example, the user device 102 may include the device authentication identifier received during authentication of the user device 102 with the transaction request message. In such an example, the user device 102 may transmit the transaction request message to the first merchant system 106a or the second merchant system 106b during the transaction.

As further illustrated in FIG. 3, at step 306, process 300 may include receiving a transaction request message. In some non-limiting embodiments, a payment gateway system 108 and/or a transaction service provider system 112 may receive a transaction request message associated with a transaction from the first merchant system 106a or the second merchant system 106b. The transaction request message may include the device authentication identifier and/or the transaction data associated with the transaction. In some non-limiting embodiments, the transaction request message may also include challenge response data associated with a challenge response and/or a device authentication identifier. In some non-limiting embodiments, the first merchant system 106a or the second merchant system 106b may transmit the transaction request message to the payment gateway system 108 and/or the transaction service provider system 112 after receiving the transaction request message from the user device 102. In some non-limiting embodiments, the first merchant system 106a or the second merchant system 106b may include the device authentication identifier in the transaction request message before transmitting the transaction request message to the payment gateway system 108 and/or the transaction service provider system 112.

In some non-limiting embodiments, the payment gateway system 108 and/or the transaction service provider system 112 may generate an authorization request message based on the transaction request message. For example, the payment gateway system 108 and/or the transaction service provider system 112 may generate the authorization request message based on the transaction request message and based on determining a device score linked to the user device 102. In such an example, the payment gateway system 108 and/or the transaction service provider system 112 may query the authentication system 110 to determine the device score linked to the user device 102 by transmitting the device authentication identifier to the authentication system 110. The authentication system 110 may perform a lookup of the device score in a database associated with the authentication system 110 and transmit the device score to the payment gateway system 108 and/or the transaction service provider system 112 generating the authorization request message. The payment gateway system 108 and/or the transaction service provider system 112 may include the device score in the authorization request message. For example, the payment gateway system 108 and/or the transaction service provider system 112 may generate the authorization request message based on, among other features, the transaction data associated with the transaction, the challenge response data associated with the challenge response, and/or the device score data associated with the device score.

In some non-limiting embodiments, authentication of a user device 102 may occur in response to receiving a transaction request message or an authorization request message. For example, in some non-limiting embodiments, the user device 102 may not be authenticated prior to generation of a transaction request message. In such examples, a device authentication identifier may not be included in the transaction request message and/or the authorization request message and, as such, the payment gateway system 108, transaction service provider system 112, and/or issuer system 114 may query the authentication system 110 for device score data associated with a device score of the user device 102. The authentication system 110 may lookup the device score data associated with the device score of the user device 102 based on a unique device identifier included in the transaction request message and/or the authorization request message, and return the device score data associated with the device score and/or a device authentication identifier message including a device authentication identifier to the payment gateway system 108, transaction service provider system 112, and/or issuer system 114 that transmitted the unique device identifier to the authentication system 110 when querying the authentication system 110. In such examples, the authentication system 110 may be included in the payment gateway system 108, the transaction service provider system 112, and/or the issuer system 114 to reduce latency when performing a lookup to retrieve the device score data associated with the device score of the user device 102.

In some non-limiting embodiments, the first merchant system 106a, the second merchant system 106b, the payment gateway system 108 and/or the transaction service provider system 112 may query the authentication system 110 to cause the authentication system to authenticate the user device 102. For example, the first merchant system 106a, the second merchant system 106b, the payment gateway system 108 and/or the transaction service provider system 112 may transmit a request to the authentication system 110 to cause the authentication system 110 to authenticate the user device 102. In such an example, the authentication system 110 may authenticate the user device 102 by transmitting a device authentication request message to the user device 102 to cause the user device 102 to generate and transmit a device authentication response message back to the authentication system 110 indicating whether the user device 102 is authentic. Where the authentication system 110 determines that the user device 102 is authentic, the authentication system 110 may transmit a device authentication identifier message to the first merchant system 106a or the second merchant system 106b that requested authentication of the user device 102. In some non-limiting embodiments, authentication system 110 may transmit device authentication identifiers that are different, the device authentication identifiers associated with the user device 102 and either the first merchant system 106a or the second merchant system 106b to reduce the chances of either a merchant and/or a third party using the device authentication identifier in a manner not intended. Additionally or alternatively, the device authentication identifiers transmitted via device authentication identifier messages to the first merchant system 106a or the second merchant system 106b may be for one-time use.

As further illustrated in FIG. 3, at step 308, process 300 may include transmitting an authorization request message including a device score. In some non-limiting embodiments, a payment gateway system 108 and/or a transaction service provider system 112 may transmit the authorization request message. For example, the payment gateway system 108 and/or the transaction service provider system 112 may transmit the authorization request message to an issuer system 114. In some non-limiting embodiments, the authorization request message may include (e.g., may have attach thereto, may incorporate, may provide, and/or the like) transaction data associated with a transaction and/or device score data associated with a device score of user device 102. In some non-limiting embodiments, the issuer system 114 may generate an authorization response message associated with disposition of the transaction including an indication as to whether the transaction was approved or not approved, whether the issuer system 114 recommends updating the device score data based on disposition of the transaction, and/or the like. For example, the issuer system 114 may generate an authorization response message based on the transaction data and/or the device score data included in the authorization request message. The device score data may be inserted into the authorization request message by the payment gateway system 108 and/or the transaction service provider system 112 as a new field, using an existing field, in combination with other data, and/or the like.

In some non-limiting embodiments, an issuer system 114 may transmit score adjustment data associated with an adjustment factor (e.g., an amount and/or a proportion by which a device score is to be updated). For example, in some non-limiting embodiments, an issuer system 114 may transmit score adjustment data associated with an adjustment factor to be applied to update a device score maintained by an authentication system 110. In such examples, the issuer system 114 may determine the adjustment factor based on receiving and processing an authorization request message. For example, the issuer system 114 may determine an adjustment factor based on determining an authorization request message is associated with a transaction that is approved or declined. Additionally or alternatively, a device score may be updated based on the final disposition of a transaction. For example, a payment gateway system 108, a transaction service provider system 112, and/or the issuer system 114 may update a device score based on determining whether a chargeback (e.g., a reversal of a transaction) was posted to the account within a period of time after the transaction was initiated (e.g., within 45 days, 60 days, 90 days, and/or the like). The payment gateway system 108, transaction service provider system 112, and/or issuer system 114 may transmit data associated with the final disposition of the transaction to the authentication system 110. In such an example, the authentication system 110 may update the device score of the user device 102 based on the data associated with the final disposition of the transaction. For example, where a transaction is approved and/or no chargeback is identified as having occurred within a period of time, the authentication system 110 may update the device score by upgrading the device score. In another example, where the transaction is not approved and/or a chargeback is identified as having occurred within the period of time, the authentication system 110 may update the device score by degrading the device score.

In some non-limiting embodiments, device score data associated with the device score may be updated at an authentication system 110 based on generation of score adjustment data by the payment gateway system 108 and/or the transaction service provider system 112. For example, the payment gateway system 108 and/or the transaction service provider system 112 may generate score adjustment data based on receiving an authorization response message at the payment gateway system 108 and/or a transaction service provider system 112 indicating the transaction was approved or not approved. The payment gateway system 108 and/or the transaction service provider system 112 may then transmit the score adjustment data to the authentication system 110 to cause the authentication system 110 to update the device score.

In some non-limiting embodiments, device score data associated with a device score may be updated by the authentication system 110. For example, the device score data associated with a device score may be updated by the authentication system 110 during a transaction (e.g., an initial transaction and/or one or more subsequent transactions that are associated with a first merchant system 106a and/or a second merchant system 106b), based on one or more factors determined during a transaction. Such factors may include, without limitation, whether the transaction was approved or not approved by an issuer system 114, the value of the transaction (e.g., authentication system 110 may update the device score of the user device 102 by a first amount that is greater than a second amount when associated with a transaction that is for a higher value than a transaction that is associated with a lower value), the amount of transactions initiated by the user device 102 within a period of time, whether the user device 102 provided a cookie (e.g., a web cookie, an Internet cookie, and/or the like) to the authentication system 110 and/or the merchant system 106 during the transaction, a time zone associated with the transaction (e.g., the time zone in which the user device 102 initiated the transaction), a geolocation associated with the transaction (e.g., an area in which the user device 102 initiated the transaction), the behavior of the user device 102 during one or more transactions, a language associated with the transaction, metadata associated with the transaction, the type of website visited during the transaction, a merchant category associated with the merchant involved in the transaction, and/or the like).

In some non-limiting embodiments, the device data associated with the device score of the user device 102 may be updated based on a transaction history of a PAN associated with the user device 102 (e.g., an account issued by issuer system 114, an account issued by another issuer system, and/or the like). In such an example, the authentication system 110 may determine that the device score of the user device 102 should be incremented where activity associated with the PAN indicates that the transaction history is positive (e.g., where no chargebacks are associated with the PAN and/or the like). In another example, the authentication system 110 may determine that the device score of the user device 102 should be decremented where activity associated with the PAN indicates that the transaction history is negative (e.g., one or more chargebacks are associated with the PAN and/or the like). Additionally or alternatively, the device data associated with the device score of the user device 102 may be updated based on device score data associated with devices that have a similar history (e.g., where the device scores are associated with transactions involving the sale of one or more of the same items, one or more of the same services, and/or the like) as user device 102. For example, authentication system 110 may update the device data associated with the device score of the user device 102 based on the device score data associated with devices that have a similar history where the history of the user device 102 and the devices that have the similar history both include purchases of the same or similar goods and/or services.

In some non-limiting embodiments, device score data associated with the user device 102 may be updated based on site score data associated with a site score for the first merchant system 106a or the second merchant system 106b. For example, authentication system 110 may maintain site score data associated with a site score for the first merchant system 106a or the second merchant system 106b. In such an example, authentication system 110 may determine that the device score data associated with the device score should be updated based on the user device 102 initiating a transaction with the first merchant system 106a or the second merchant system 106b. Authentication system 110 may then update the device score data associated with the device score based on the site score data associated with the site score.

In some non-limiting embodiments, an issuer system 114 may transmit data associated with the one or more factors to cause the authentication system 110 to update the device score based on processing and/or determining the authorization request message. For example, in some non-limiting embodiments, the issuer system 114 may determine score adjustment data based on processing the authorization request message and generate an authorization response message including data associated with the one or more factors. In some non-limiting embodiments, the device score data associated with the device score may be updated outside of the context of a transaction. For example, the device score may be updated based on a determination (e.g., by the authentication system 110) that the user device 102 is reported stolen, that the issuer system 114 declares a transaction bad after the transaction is processed (e.g., when a chargeback occurs), that one or more risk models are executed in batch by the authentication system 110 to determine the activity of the account associated with the user device 102 is or is not authentic, and/or the like.

In some non-limiting embodiments, an algorithm developed in accordance with a set of logical rules may be executed to update the device score data associated with the device score to identify possibly fraudulent transactions. For example, authentication system 110 may compare the logical rules to the one or more parameters (e.g., a transaction time, a transaction date, a transaction location, a transaction value, and/or the like) of one or more transactions associated with the user device 102. Additionally or alternatively, authentication system 110 may execute a machine learning algorithm and provide, as input to the machine learning algorithm, device score data and transaction data associated with transactions involving the user device 102 to cause the machine learning algorithm to predict a device score that is updated based on the transaction data for the user device 102. In some non-limiting embodiments, a device score may not be updated when disposition of a transaction was not based on activity associated with the transaction (e.g., when the transaction is declined because of a timeout or inability of the payment gateway system 108 and/or the transaction service provider system 112 to transmit and/or receive data from the issuer system 114 during a transaction, and/or the like).

Figure 4A:
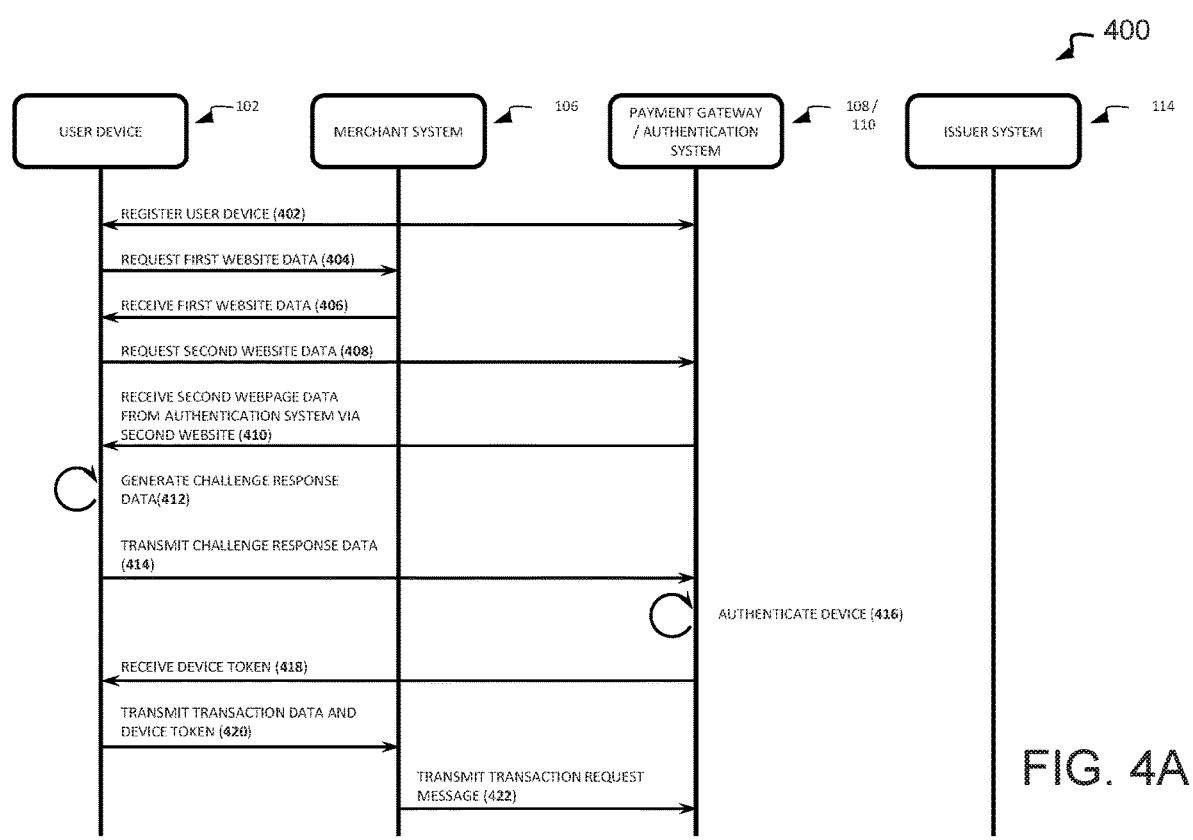
FIGS. 4A and 4B are diagrams of an implementation of a non-limiting aspect or embodiment of a process for authenticating devices.
Figure 4B:
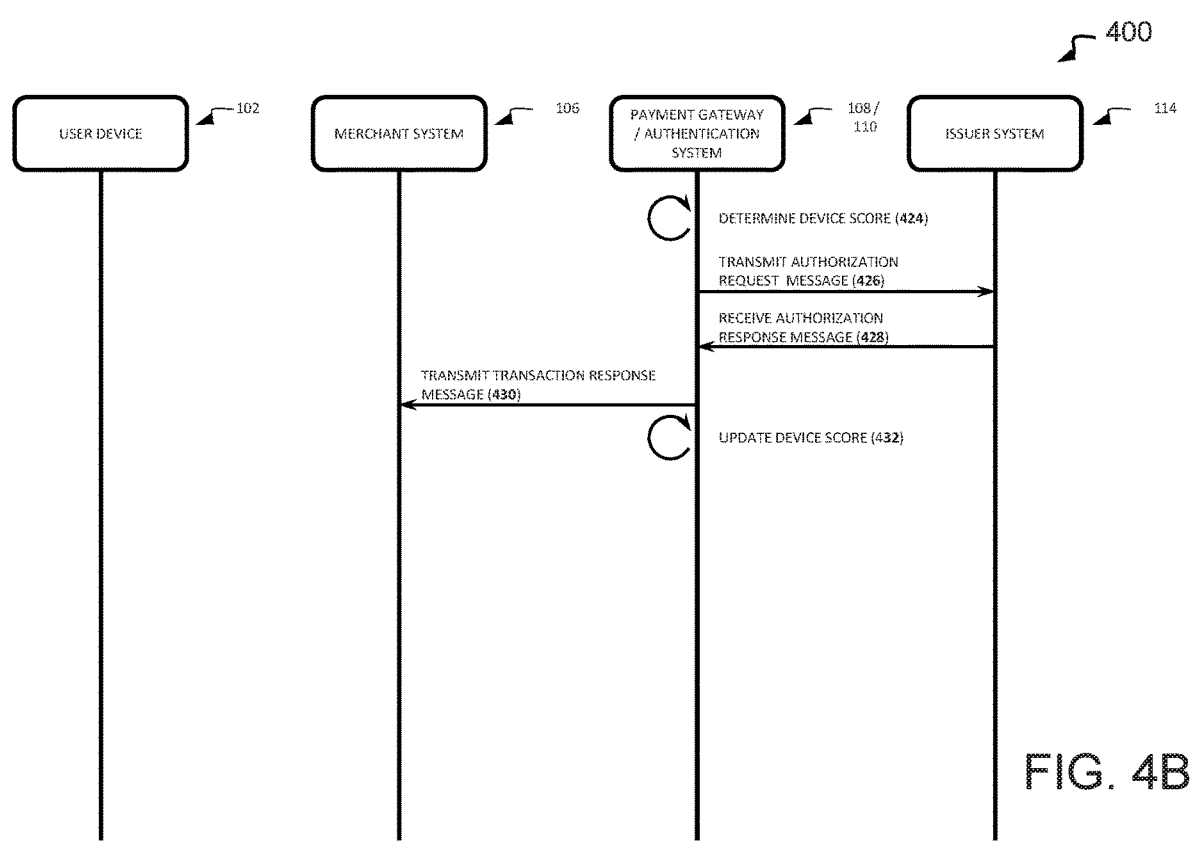

Referring now to FIGS. 4A and 4B, illustrated is an implementation 400 of a non-limiting aspect or embodiment of a process for authenticating devices according to some non-limiting embodiments of the present disclosure. As illustrated in FIGS. 4A and 4B, implementation 400 includes a user device 102, a first merchant system 106a, a payment gateway system 108, an authentication system 110, and an issuer system 114.

As shown by reference number 402 in FIG. 4A, a user device 102 may register with an authentication system 110 of a payment gateway system 108. For example, in some non-limiting embodiments, the user device 102 may generate encryption data associated with a public key and/or a private key, and/or the like. In such an example, the user device 102 may include the encryption data in registration data associated with registration of the user device 102. Additionally or alternatively, the user device 102 may include a unique device identifier in the registration data. The authentication system 110 may associate the registration data with an account maintained by the authentication system 110 based on receiving registration data. Additionally or alternatively, the authentication system 110 may associate the registration data with device score data associated with a device score of the user device 102.

As shown by reference number 404 in FIG. 4A, the user device 102 may request first website data associated with a first website from the first merchant system 106a. For example, the user device 102 may attempt to login via a login page of a first website.

As shown by reference number 406 in FIG. 4A, the user device may receive first website data from a first merchant system 106a. For example, the user device 102 may receive the first website data associated with the first website transmitted by the first merchant system 106a, the first website data including a uniform resource locator (URL) to a second website maintained by the authentication system 110.

As shown by reference number 408 in FIG. 4A, the user device 102 may request second website data associated with a second website. For example, the user device 102 may transmit a request for second website data associated with a second website from the authentication system 110, the second website data associated with the URL to the second website included in the first website data.

As shown by reference number 410 in FIG. 4A, the user device 102 may receive second website data from the authentication system 110. For example, the user device 102 may receive second website data from the authentication system 110 in response to requesting the second website data. The second website data may include a device authentication request message including challenge data associated with a challenge. In some non-limiting embodiments, the user device 102 may prompt the user to respond to a local authentication request before generating challenge response data associated with a challenge. In such an example, the user operating the user device may provide input to the user device 102 including identifying data associated with the user's identity.

As shown by reference number 412 in FIG. 4A, the user device 102 may generate challenge response data associated with a challenge response. For example, the user device 102 may encrypt the challenge data and/or data derived from the challenge data with a private key of the user device 102. In some non-limiting embodiments, the user device 102 may also include a unique device identifier of the user device 102 with or in the challenge data.

As shown by reference number 414 in FIG. 4A, the user device 102 may transmit the challenge response data associated with the challenge response. For example, the user device 102 may transmit the challenge response data to the authentication system 110 via the second website. In another example, the user device 102 may transmit the challenge response data to the authentication system 110 via a device authentication response message.

As shown by reference number 416 in FIG. 4A, the authentication system 110 may authenticate the user device 102. For example, the authentication system 110 may authenticate the user device 102 by decrypting the challenge response data associated with the challenge response transmitted via the device authentication response message with a public key of the user device 102. The authentication system 110 may compare the decrypted challenge response data to the challenge data and/or the registration data to determine that the user device 102 is authentic.

As shown by reference number 418 in FIG. 4A, the authentication system 110 may transmit a device authentication identifier to the user device 102. For example, the authentication system 110 may transmit the device authentication identifier based on successful authentication of the user device 102. In such an example, the device authentication identifier may be transmitted via a device authentication identifier message to the user device 102. In some non-limiting embodiments, the authentication system 110 may generate a one-time use token and transmit the one-time use token as the device authentication identifier to the merchant system 106 via a frame associated with the second website.

As shown by reference number 420 in FIG. 4A, the user device 102 may transmit transaction data associated with a transaction and the device authentication identifier to the first merchant system 106a. For example, the user device 102 may transmit transaction data associated with a transaction and the device authentication identifier to the first merchant system 106a based on receiving the device authentication identifier from the authentication system 110. In such an example, the user device may transmit transaction data associated with a transaction and the device authentication identifier via a transaction request message to the first merchant system 106a.

As shown by reference number 422 in FIG. 4A, the first merchant system 106a may transmit a transaction request message to the payment gateway system 108. For example, the first merchant system 106a may generate a transaction request message based on receiving transaction data associated with the transaction and the device authentication identifier. In some non-limiting embodiments, the first merchant system 106a may forward the transaction request message received from the user device 102 to the payment gateway system 108.

As shown by reference number 424 in FIG. 4B, the payment gateway system 108 may determine a device score. For example, the payment gateway system 108 may query the authentication system 110 for the device score by transmitting the device authentication identifier to the authentication system 110. The authentication system 110 may lookup device score data associated with the device score in a database based on the device authentication identifier. The authentication system 110 may then transmit the device score data associated with the device score of the user device 102 to the payment gateway system 108.

As shown by reference number 426 in FIG. 4B, the payment gateway system 108 may transmit an authorization request message. For example, the payment gateway system 108 may generate an authorization request message based on the transaction data associated with the transaction and the device score data associated with the device score. The payment gateway system 108 may then transmit the authorization request message including the transaction data and the device score data to the issuer system 114.

As shown by reference number 428 in FIG. 4B, the payment gateway system 108 may receive an authorization response message from the issuer system 114. For example, the issuer system 114 may determine whether the transaction is approved or not approved based on the transaction data and the device score data included in the authorization request message. The issuer system 114 may then generate an authorization response message based on determining whether the transaction is approved or not approved, and transmit the authorization response message to the payment gateway system 108. In some non-limiting embodiments, the issuer system 114 may also include data associated with one or more factors of the transaction and/or adjustment factor data associated with an adjustment factor in the authorization response message.

As shown by reference number 430 in FIG. 4B, the payment gateway system 108 may transmit a transaction response message to the first merchant system 106a. For example, the payment gateway system 108 may generate a transaction response message indicating that the transaction is approved or declined based on the authorization response message. In some non-limiting embodiments, the first merchant system 106a may subsequently transmit data to the user device 102 indicating that the transaction is approved or declined.

As shown by reference number 432 in FIG. 4B, the authentication system 110 may update the device score data associated with the device score. For example, the payment gateway system 108 may transmit the authorization response message to the authentication system 110 to cause the authentication system 110 to update the device score data associated with the device score.

Although examples have been described in detail for the purpose of illustration based on what is currently considered to be the most practical and preferred aspects or embodiments, it is to be understood that such detail is solely for that purpose and that the principles described by the present disclosure are not limited to the disclosed aspects or embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for authenticating devices, the computer-implemented method comprising:
receiving, with at least one processor, a request for a device authentication identifier of an account of a user;
transmitting, with at least one processor, a device authentication identifier request message via a frame embedded in a webpage of a merchant website, the device authentication identifier request message comprising challenge data associated with a challenge;
receiving, with at least one processor, a device authentication response message via the frame embedded in the webpage of the merchant website based on the device authentication identifier request message, the device authentication response message comprising challenge response data associated with a challenge response;
transmitting, with at least one processor, a device authentication identifier message comprising the device authentication identifier associated with the account of the user based on the device authentication response message;
receiving, with at least one processor, a transaction request message associated with a transaction, comprising:
the device authentication identifier, and
transaction data associated with the transaction,
determining that a device score associated with the account of the user corresponds to the device authentication identifier;
generating, with at least one processor, an authorization request message based on the transaction data and the device score;
transmitting, with at least one processor, the authorization request message to an issuer system;
receiving, with at least one processor, an authorization response message from the issuer system, the authorization response message generated in response to receiving the authorization request message;
updating, with at least one processor, the device score based on a disposition of the transaction, wherein updating the device score based on the disposition of the transaction comprises:
determining whether a chargeback occurred or did not occur within a period of time after the transaction was settled; and
updating the device score based on determining whether the chargeback occurred or there was no chargeback within the period of time; and
in response to updating the device score, transmitting, with at least one processor, device score data associated with the device score and a transaction response message to a computing device associated with a merchant.

2. The computer-implemented method according to claim 1, further comprising:
receiving, with at least one processor, a public key from a computing device associated with a user to register the computing device with the account associated with the user, the account further associated with the device score;
wherein, when registering the computing device with an account associated with the user, the device score is set to a default value associated with a default score.

3. The computer-implemented method according to claim 2, further comprising:
determining, with at least one processor, that a second computing device was previously registered with the account associated with the user;
transmitting, with at least one processor, a new device registration message to the second computing device including a prompt to verify that the computing device is permitted to be registered;
receiving, with at least one processor, a registration response message including an indication as to whether the computing device is permitted to be registered in association with the second computing device; and
determining, with at least one processor, that the computing device is permitted to be registered based on the indication included in the registration response message,
wherein, when registering the computing device with the account associated with the user, the device score is set to a value based on a value of an existing device score of the second computing device after determining that the computing device is permitted to be registered in association with the second computing device.

4. The computer-implemented method according to claim 1, further comprising:
receiving, with at least one processor, an authorization response message;
determining, with at least one processor, that the transaction is not approved based on the authorization response message; and
updating, with at least one processor, the device score based on determining that the transaction is declined based on the authorization response message.

5. The computer-implemented method according to claim 3, further comprising:
determining, with at least one processor, that a fraudulent transaction is associated with an authentication application; and
updating, with at least one processor, the device score based on determining the fraudulent transaction is associated with the authentication application.

6. The computer-implemented method according to claim 1, wherein the computing device associated with the user is configured to:
display, on a display of the computing device associated with the user, a local authentication request in response to receiving the device authentication request message;
receive a local authentication response as input at the computing device associated with the user; and
transmit a device authentication response based on receiving the local authentication response.

7. A system for authenticating devices, the system comprising:
at least one processor programmed or configured to:
receive a request for a device authentication identifier of an account of a user;
transmit a device authentication request message via a frame embedded in a webpage of a merchant website, the device authentication request message comprising challenge data associated with a challenge;
receive a device authentication response message via the frame embedded in the webpage of the merchant website based on the device authentication request message, the device authentication response message comprising challenge response data associated with a challenge response;
transmit a device authentication identifier message comprising the device authentication identifier associated with the account of the user based on the device authentication response message;
receive a transaction request message associated with a transaction, comprising:
the device authentication identifier, and
transaction data associated with the transaction,
determine a device score associated with the account of the user based on the device authentication identifier;
generate an authorization request message including the transaction data and the device score;
transmit the authorization request message to an issuer system;
receive an authorization response message from the issuer system, the authorization response message generated in response to receiving the authorization request message;
update the device score based on a disposition of the transaction, wherein updating the device score based on the disposition of the transaction comprises:
determine whether a chargeback occurred or did not occur within a period of time after the transaction was settled; and
update the device score based on determining whether the chargeback occurred or there was no chargeback within the period of time; and
in response to updating the device score, transmit device score data associated with the device score and a transaction response message to a computing device associated with a merchant.

8. The system according to claim 7, wherein the at least one processor is programmed or configured to:
receive a public key from a computing device associated with a user to register the computing device with the account associated with the user, the account further associated with the device score;
wherein, when registering the computing device with an account associated with the user, the at least one processor is programmed or configured to set the device score to a default value associated with a default score.

9. The system according to claim 8, wherein the at least one processor is programmed or configured to:
determine that a second computing device was previously registered with the account associated with the user,
wherein, when registering the computing device with the account associated with the user, the at least one processor is programmed or configured to set the device score to a value based on an existing device score of the second computing device.

10. The system according to claim 7, wherein the at least one processor is programmed or configured to:
receive an authorization response message;
determine that the transaction is declined or approved based on the authorization response message; and
update the device score based on determining that the transaction is declined or approved based on the authorization response message.

11. The system according to claim 8, wherein the at least one processor is programmed or configured to:
determine that a fraudulent transaction is associated with a device associated with the user; and
update the device score based on determining the fraudulent transaction is associated with the device associated with the user.

12. The system according to claim 7, wherein a computing device associated with the user comprises at least one processor programmed or configured to:
display, on a display of the computing device associated with the user, a local authentication request in response to receiving the device authentication request message;
receive a local authentication response as input at the computing device associated with the user; and
transmit a device authentication response based on receiving the local authentication response.

13. A computer program product for authenticating devices, the computer program product comprising at least one non-transitory computer-readable medium comprising one or more instructions that, when executed by at least one processor cause the at least one processor to:
receive a request for a device authentication identifier of an account of a user;
transmit a device authentication request message via a frame embedded in a webpage of a merchant website, the device authentication request message comprising challenge data associated with a challenge;
receive a device authentication response message via the frame embedded in the webpage of the merchant website based on the device authentication request message, the device authentication response message comprising challenge response data associated with a challenge response;

transmit a device authentication identifier message comprising the device authentication identifier associated with the account of the user based on the device authentication response message;

receive a transaction request message associated with a transaction, comprising:

the device authentication identifier, and transaction data associated with the transaction, determine a device score associated with the device authentication identifier;

generate an authorization request message based on the transaction data and the device score;

transmit the authorization request message to an issuer system;

receive an authorization response message from the issuer system, the authorization response message generated in response to receiving the authorization request message;

update the device score based on a disposition of the transaction, wherein updating the device score based on the disposition of the transaction comprises:

determine whether a chargeback occurred or did not occur within a period of time after the transaction was settled; and update the device score based on determining whether the chargeback occurred or there was no chargeback within the period of time; and in response to updating the device score, transmit device score data associated with the device score and a transaction response message to a computing device associated with a merchant.

14. The computer program product according to claim 13, wherein the one or more instructions further cause the at least one processor to:

receive a public key from a computing device associated with a user to register the computing device with the account associated with the user, the account further associated with the device score;

wherein, when registering the computing device with an account associated with the user, the at least one processor is programmed or configured to set the device score to a default value associated with a default score.

15. The computer program product according to claim 14, wherein the one or more instructions further cause the at least one processor to:

determine that a second computing device was previously registered with the account associated with the user, wherein, when registering the computing device with the account associated with the user, the at least one processor is programmed or configured to set the device score to a value of an existing device score of the second computing device.

* * * * *